(No Model.) 2 Sheets—Sheet 1.
H. BLACKMAN.
APPARATUS FOR RECOVERING ALKALI.
No. 478,980. Patented July 19, 1892.
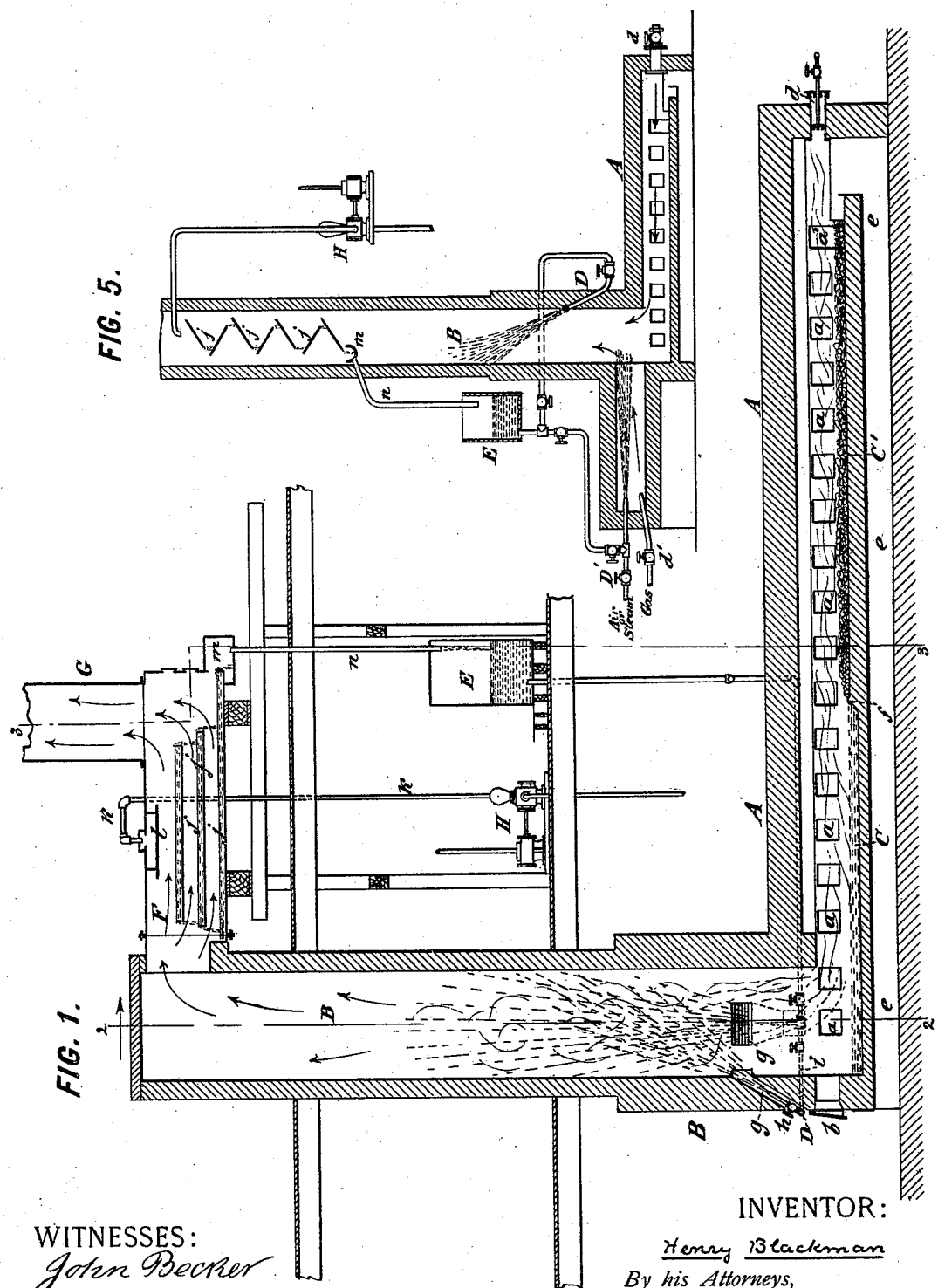
WITNESSES:
John Becker
C. K. Fraser.
INVENTOR:
Henry Blackman
By his Attorneys,
Arthur C. Fraser & Co.

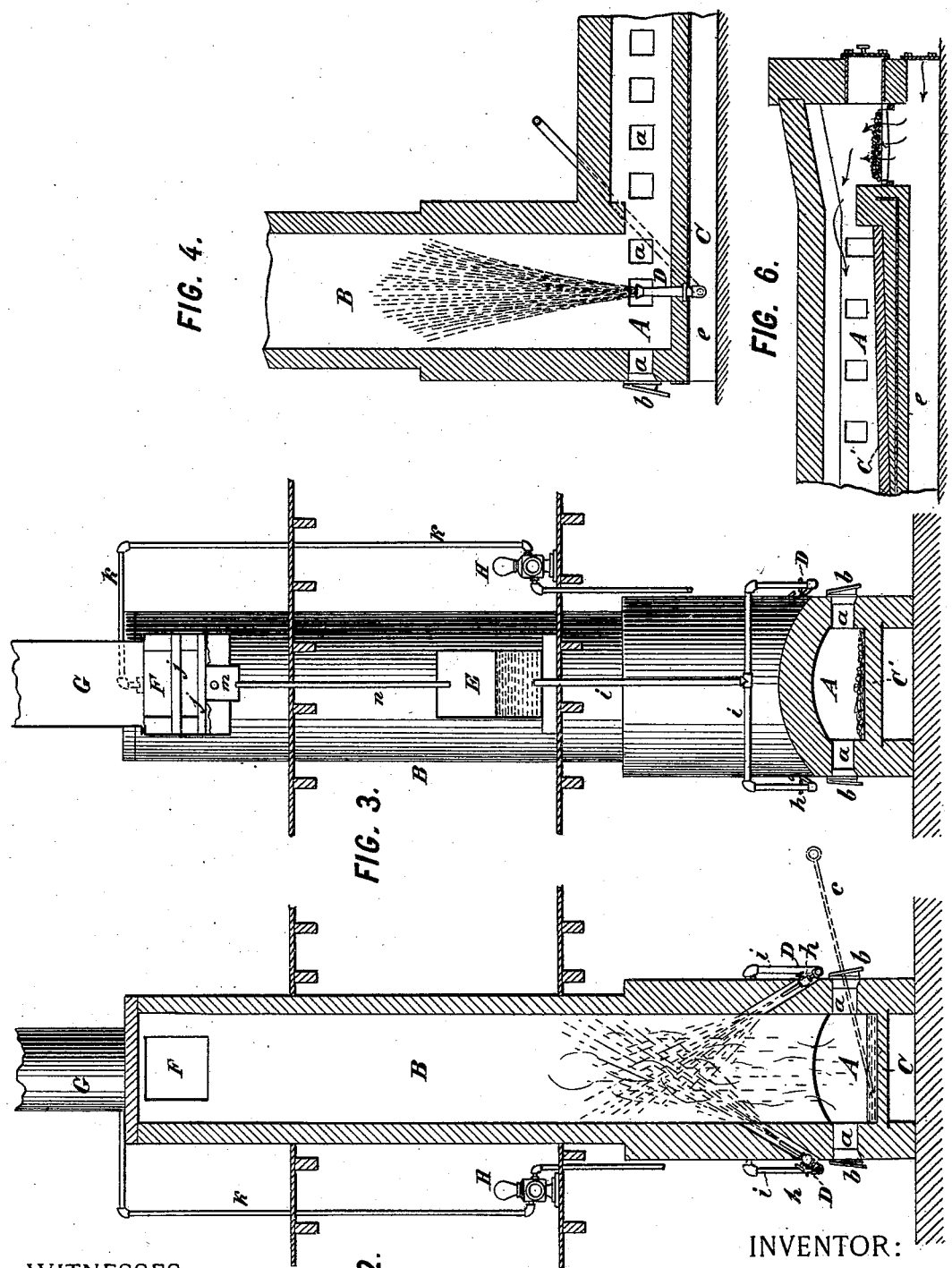

UNITED STATES PATENT OFFICE.

HENRY BLACKMAN, OF NEW YORK, N. Y.

APPARATUS FOR RECOVERING ALKALI.

SPECIFICATION forming part of Letters Patent No. 478,980, dated July 19, 1892.

Application filed September 20, 1889. Serial No. 324,551. (No model.)

*To all whom it may concern:*

Be it known that I, HENRY BLACKMAN, a citizen of the United States, residing in New York city, in the county and State of New York, have invented certain new and useful Improvements in Apparatus for Evaporating and Calcining Alkaline and other Solutions, of which the following is a specification.

This invention relates to the recovery of alkalies, lime, and other substances from solution by means of evaporation and calcination of the solution in a furnace.

In calcining-furnaces as heretofore used it is customary to first evaporate the free water or other volatile constituents from the alkaline or other solution by the exposure of the latter to the heat of the furnace and subsequently when the material has been reduced to solid or semi-solid condition to expose it on the calcining hearth or floor of the furnace to the intense heat of the flames playing across the hearth, while stirring or working it from time to time with tools or pokers inserted through openings in the side of the furnace, whereby all portions of the mass are exposed to the heat and their calcination is completed, after which the charge is shoveled out and a new charge is introduced. It has also been proposed to spray or sprinkle the solution into the furnace directly over the calcining-bed and into the stream of flames and products of combustion in order to evaparate the water and cause the alkali or other matter to fall in flakes upon the floor, where it is stirred or manipulated to complete its calcination. Both these methods are necessarily intermittent in their operation and by reason of their slowness are unduly expensive.

My present invention provides an improved apparatus for the recovery of alkalies and other refractory substances from solution in or mixture with other substances which are either vaporizable or combustible. It is designed more especially for the recovery of soda from spent liquors of wood-pulp mills.

My improved apparatus consists, preferably, of a horizontal calcining-chamber through which a stream of flames or hot gases is caused to pass longitudinally, with an upright stack or vertical chamber communicating therewith, into which the gases flow from the calcining-chamber and through which they ascend, passing eventually to the chimney. Into this upright stack the liquor or solution to be treated is injected or sprayed in an upward direction, so that the liquid particles travel upwardly along with the hot gases, and are thereby evaporated, and fall through the ascending gases in the form of flakes or of semi-solid particles or even of dense liquid, which is received upon a calcining-hearth in the end of the calcining-chamber beneath. The material falling upon this hearth is then gradually pushed backward through the calcining-chamber while working or stirring it by means of tools inserted through suitable openings, so that it is exposed to the heat of the gases playing over this hearth, and as it is moved from one end to the other of the chamber its complete calcination is gradually effected, and it is finally removed from the opposite end of the chamber. The process of calcination is thus made a continuous process instead of an intermittent one, as heretofore. The gases of combustion rising through the stack after they pass beyond the highest point to which the injected liquid rises are utilized to concentrate the liquid before its injection by being passed through an evaporator, wherein the liquid is exposed, preferably, to direct contact with the gases, and is thereby rapidly concentrated to the greatest density consistent with its injection. This evaporator being arranged at a considerable elevation, the concentrated liquid from it is conducted to a tank which is at such height as to afford the requisite head under which to inject the liquid by hydrostatic pressure through injector-nozzles located at the lower part of the stack.

Figure 1 of the accompanying drawings is a vertical longitudinal mid-section showing the apparatus in operation. Fig. 2 is a vertical transverse section thereof on the line 2 2 in Fig. 1. Fig. 3 is a vertical transverse section on the line 3 3 in Fig. 1 and looking in the opposite direction to Fig. 2. Fig. 4 is a section similar to Fig. 1, showing a modified construction. Fig. 5 is a vertical section, on a smaller scale, of a modified furnace. Fig. 6 is a vertical section showing a modification of the delivery end of the furnace.

My improved furnace consists, essentially, of two parts—a horizontal calcining-furnace A and a vertical stack B—the two being preferably connected together, so that the stack forms a continuation of the horizontal furnace.

The calcining-furnace A consists of a long low chamber having a series of doors or openings $a\ a$ in its opposite sides and formed with a flat bottom or floor to form a calcining-hearth, which hearth is preferably divided into two portions, (lettered C and C', respectively.) The openings $a\ a$ are closed by suitable doors $b\ b$ or in any known way and are so arranged as to admit of the insertion of stirring bars, hoes, or paddles—such, for example, as the bar shown at $c$ in Fig. 2—in order to stir or manipulate the material on the calcining-hearth and by which to move the material along from time to time.

The end of the furnace A which communicates with the the stack B is the receiving end and the opposite end is the discharge end. At the discharge end the furnace is fitted with a nozzle or burner $d$ for introducing gaseous fuel under pressure or with a grate for burning coal in the usual manner, so that in either case the flames or burning gases from the fuel shall play longitudinally through the furnace close over the hearth. Air may be introduced along with the gaseous fuel, as is commonly practiced in the burning of natural gas, or it may be introduced through a flue $e$, extending under the hearth C C', so that the air in its passage is heated before it unites with the gas. The hearth C is at somewhat lower level than the hearth C' and joins the latter through an incline $f$, which preferably rises somewhat higher than the level of the hearth C' to form a dam. The stack B rises directly from the receiving end of the furnace A after the manner of any ordinary chimney and to any suitable height. In its sides and near its lower end are formed openings $g\ g$, entering each in a diagonally-upward direction from the exterior, and into these openings project injector-nozzles D D, through which the soda-liquor or other liquid is injected into the stack. Each nozzle is provided with a valve $h$. The nozzles are fed by a pipe or pipes $i$, leading from a liquor-reservoir E, containing the liquid and arranged at such height as to afford the requisite hydrostatic pressure to properly inject the liquid into the stack and to carry the injected liquor to the desired height within the stack after the manner of a fountain.

At the upper end of the stack is a lateral opening communicating with an evaporator F, consisting of a horizontally-extended casing, through which the hot gases from the stack may flow and from which they pass into the chimney G. In this casing is arranged a series of trays $j\ j$, adapted to hold each a shallow body of the liquid to be treated. The liquid is pumped up by a pump H through a pipe $k$, which discharges into the top of the casing of the evaporator F onto a horizontal plate $l$, from which the liquid falls into the upper tray $j$, and thence into the second tray, and from that into the lower tray, while from the latter it falls into a box or receiver $m$ and runs down pipe $n$ into the elevated reservoir E. The liquid in the trays is subjected to direct contact with the hot gases and products of combustion from the furnace, and is thereby rapidly and economically evaporated by the utilization as far as possible of the waste heat of these gases, which would otherwise be lost in the chimney. By virtue of the open trays for the liquid being placed in the conduit for the gases the disengaged steam, together with any deleterious vapors, is carried into the chimney with the gases and discharged in the least objectionable way into the atmosphere. Any particles of liquid from the injector-nozzles that may be carried by the ascending gases will be disengaged therefrom in the evaporator F and will fall into the trays and be saved.

The operation is as follows: The waste soda-liquor or other liquid or solution to be treated is forced by the pump H into the evaporator F, where it is concentrated to a considerable density and whence it runs down into the reservoir E. From the latter it flows to the injector-nozzles under sufficient pressure to cause it to be discharged into the stack with such force as to carry it up in the stack along with the ascending gases of combustion to a considerable height, its ascent being assisted by the upward current of gas, and by contact with the hot gases and flames the particles of liquid are more or less dried by evaporation of their water or other volatile ingredients and fall in the form of flakes of solid or semi-solid matter or in densely-concentrated liquid particles upon the receiving end of the hearth C. In thus falling the particles descend through an ascending current of heated gases or flames and are further vaporized and calcined. The mass upon the hearth C will be but partly calcined and may be in a semi-liquid condition. Upon this hearth it is exposed to the heat of the flames playing over it, and by means of tools inserted through the openings $a\ a$ it is gradually moved toward the right in Fig. 1 until when it reaches the dam $f$ it is pretty thoroughly deprived of moisture, although still not as thoroughly calcined as is necessary for the driving off of all foreign matters. The workmen then push it up over the incline of the dam $f$ and onto the finishing-hearth C', where it is stirred and manipulated to present continually fresh surfaces to the action of the flames and gradually moved along until finally when it reaches the end of this hearth it is fully calcined, whereupon it is removed through the opening $a'$. During its treatment on the hearth the gummy and resinous matters are burned out and serve as additional fuel, the heat from which is utilized in the evaporation and calcination of the alkaline solution. The openings $g\ g$ admit more or less air into the bottom of the stack, which, if considered objectionable, may be prevented by closing them, or the construction shown in Fig. 4 may be adopted, wherein a single nozzle projects upwardly through the hearth C and in line with the central axis of the stack, being tipped with a rose or otherwise suitably formed to distribute the injected spray, as may be desired.

The liquid to be treated may be injected along with a blast of air or gaseous fuel or of steam in order to atomize it and at the same time to introduce either further fuel or oxygen into the stack, as fully set forth in my applications for patents, Serial Nos. 279,605 and 279,606, filed July 11, 1888. Such atomizing, however, forms no part of my present invention.

Fig. 5 shows a modified construction of furnace, wherein the calcining-chamber A and stack B are not materially altered; but the injection of liquid is not made necessarily directly into the stack B, but into a horizontal chamber B', communicating with the stack at or near its base. The liquid from the elevated tank E passes by a pipe $i$ to an injector-nozzle D', which is supplied, also, with an air or steam pipe $p$, in order that, if desired, air or steam may be injected with the liquid to atomize it. The nozzle D' directs the liquid in horizontal direction into the chamber B', and it is subjected therein to heat from burning gas introduced through a nozzle or burner $d'$. In addition the nozzle D may be arranged to inject a portion of the liquid upwardly into the stack, as before.

The evaporator F may also be modified, as shown in Fig. 5, where it consists of a series of inclined plates $j'$, arranged in the upper part of the stack B above the reach of the injected liquid and so constructed that the liquid discharged upon the upper of these plates by the pump H will flow down over the respective plates and fall from each to the next below and in so doing will come into intimate contact with the ascending stream of hot gases, whereby its vaporizable constituents will be carried off. The denser liquid from the lowermost plate falls into a trough or receiver $m'$, whence it is conducted by a pipe $n$ to the tank E.

The furnace A and stack B might be constructed separately from one another; but this would necessitate the transference of the partly-calcined matter from the hearth under the stack to the receiving end of the furnace A, which would effect a loss of time and labor.

Fig. 6 shows the construction of the delivery end of the furnace A in case coal is to be burned instead of gas. A grate $p$, bridge-wall $q$, and ash-pit $r$ are provided, as in the usual construction of furnaces for burning solid fuel.

Whenever burning gases are referred to in this specification, they are to be understood as referring either to injected gas or to the gases emanating from solid or liquid fuel during combustion.

The specific arrangement and details of construction of my improved furnace may be greatly varied without departing from the essential features of my invention, which will be recited in the claims.

I claim as my invention the following-defined novel features and combinations, substantially as hereinbefore set forth, namely:

1. A calcining-furnace consisting of the combination of an upright stack, an inlet for gases of combustion at the lower part thereof, so that the gases ascend therethrough, and an upwardly-directed nozzle entering said stack, through which a liquid to be treated may be injected.

2. A calcining-furnace consisting of the combination of an upright stack, an inlet for gases of combustion at the lower part thereof, so that the gases ascend therethrough, an upwardly-directed nozzle entering said stack, and an elevated reservoir of liquid to be treated connected by a pipe with said nozzle, whereby the liquid to be treated is injected by hydrostatic pressure into the stack.

3. A calcining-furnace consisting of the combination of an upright stack, an inlet for gases of combustion at the lower part thereof, so that the gases ascend therethrough, an upwardly-directed nozzle entering said stack through which a liquid to be treated may be injected, and an evaporator for the liquid to be treated arranged to be traversed by the gases of combustion after the latter have passed beyond the injected liquid, whereby the gases first evaporate the spray of denser liquid injected beneath and subsequently their heat is utilized to concentrate the less dense liquid.

4. In a calcining-furnace, the combination of an upright stack, an inlet for gases of combustion at the lower part thereof, so that the gases ascend therethrough, a nozzle entering said stack through which a liquid to be treated may be injected into the ascending gases, and an evaporator for the liquid to be treated arranged to be traversed by the gases after they have passed beyond the injected liquid and consisting of shelves or trays, over which the liquid is flowed, arranged in the path of the gases, whereby the liquid is brought into direct contact therewith.

5. A calcining-furnace consisting of the combination of an upright stack, an inlet for gases of combustion at the lower part thereof, so that the gases ascend therethrough, an upwardly-directed nozzle entering said stack through which a liquid to be treated may be injected, and an evaporator for the liquid to be treated arranged to be traversed by the gases of combustion after the latter have passed beyond the injected liquid and consisting of a horizontal trunk through which the gases pass from the stack, and superposed trays therein for holding the liquid.

6. In a calcining-furnace, the combination of a calcining-chamber extended horizontally and provided with a calcining hearth or floor divided into two portions, a primary calcining-hearth at the entering end of the chamber and a secondary calcining-hearth extending thence to the discharge end, separated by an inclined plane leading up from the primary to the secondary hearth, an inlet for gases of combustion at the discharge end of said chamber, and means for introducing the material to be treated at the entering end thereof.

In witness whereof I have hereunto signed my name in the presence of two subscribing witnesses.

HENRY BLACKMAN.

Witnesses:
 HARRY FOX,
 A. L. WRIGHT.